(No Model.)
A. G. STEWART.
CYLINDER FOR THRASHERS.
No. 283,529. Patented Aug. 21, 1883.
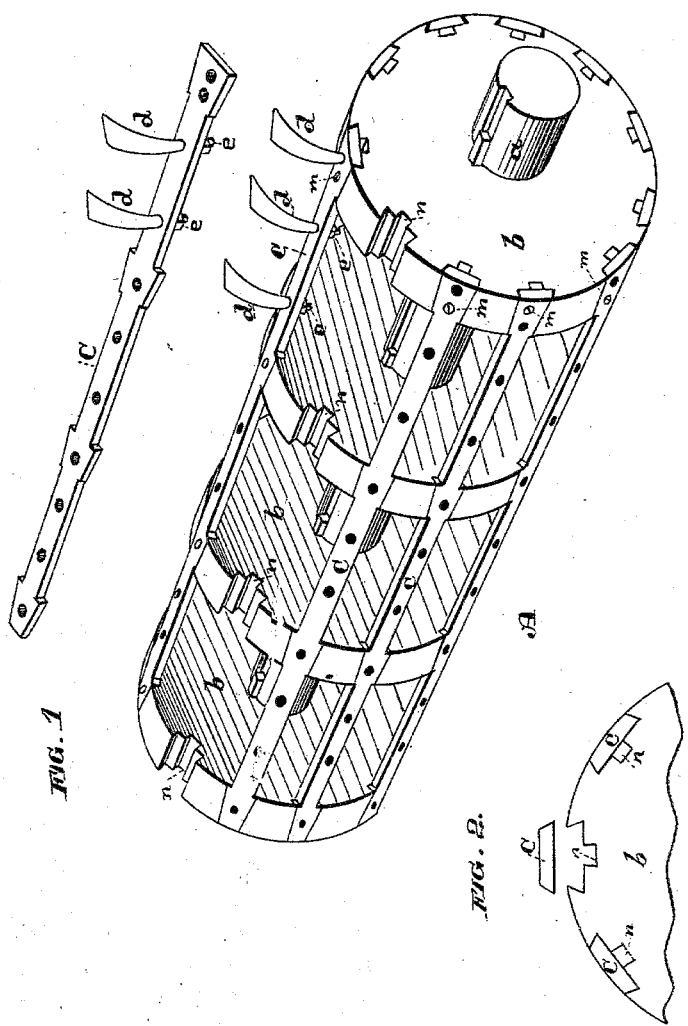
Witnesses,
Geo. H. Strong.
G. H. Frome
Inventor
A. G. Stewart
By Dewey & Co.
Attorneys

UNITED STATES PATENT OFFICE.

ANDREW G. STEWART, OF OAKLAND, CALIFORNIA.

CYLINDER FOR THRASHERS.

SPECIFICATION forming part of Letters Patent No. 283,529, dated August 21, 1883.

Application filed May 29, 1883. (No model.)

*To all whom it may concern:*

Be it known that I, ANDREW G. STEWART, of Oakland, county of Alameda, and State of California, have invented an Improvement in Cylinders for Thrashers; and I hereby declare the following to be a full, clear, and exact description thereof.

My invention relates to a new and useful improvement in the cylinder for a thrashing-machine; and it consists in the combination of devices and arrangement of parts hereinafter described and claimed.

Referring to the accompanying drawings, Figure 1 is a perspective view of a cylinder, showing one of the bars C removed. Fig. 2 is an end elevation of a portion of the cylinder, showing one bar C removed.

A is the cylinder, comprising, as usual, the shaft $a$, the disks or flanges $b$, keyed thereon, the tooth-holding cross-bars $c$, and the teeth $d$. These latter are secured in the bars by passing through and receiving nuts $e$ behind, and they are arranged, as usual, over the surface of the cylinder. The bars $c$ are dovetailed into the rims of the disks $b$ with wedge-shaped dovetails, as shown, and are held therein by a single set-screw, $m$, in each. This set-screw is placed at one end, and enters the end disk. It is placed either outside or inside of the end tooth, according to the position of said tooth in the general arrangement. If this arrangement should be such that the set-screw could not be there inserted, it could enter the side of the disk from a lug under the bar, or it could enter a lug or projection on the disk, or it may be put in the most accessible place. The dovetailing holds the bars in place and prevents them from leaving the disks directly, while the wedge-shape of the dovetail joint prevents a movement endwise in one direction. The screws hold them in the other direction. By removing the screws the bars may be readily slipped out and removed, when the securing-nuts $e$ may be taken off and the teeth freed or repaired. Others may be substituted and the bars returned or secured.

In order to provide for having teeth over the disks as well as in other portions of the bars, there is a groove, $n$, formed in the bottom of the dovetailed mortise in the disks. This allows space for the nuts $e$.

Having thus described my invention, what I claim as new, and desire to secure by Letters Patent, is—

1. In a cylinder for thrashers, the flanges or disks $b$, in combination with the tooth-holding cross-bars $c$, secured in the rims of said disks by a wedge-shaped dovetail, and the set-screw $m$ at one end, substantially as and for the purpose herein described.

2. In a cylinder for thrashers, the flanges or disks $b$, in combination with the tooth-holding cross-bars $c$, secured in the rims of said disks by a wedge-shaped dovetail, the set-screws $m$ holding said bars, the teeth $d$, having securing-nuts $e$, and the grooves $n$ in the bottom of the dovetail mortise in the disks, substantially as and for the purpose herein described.

In witness whereof I have hereunto set my hand.

ANDREW G. STEWART.

Witnesses:
A. A. PRESCOTT,
WM. K. ROWELL.